June 24, 1930.    K. RUE    1,767,619
QUACK GRASS ERADICATOR
Filed Sept. 29, 1926
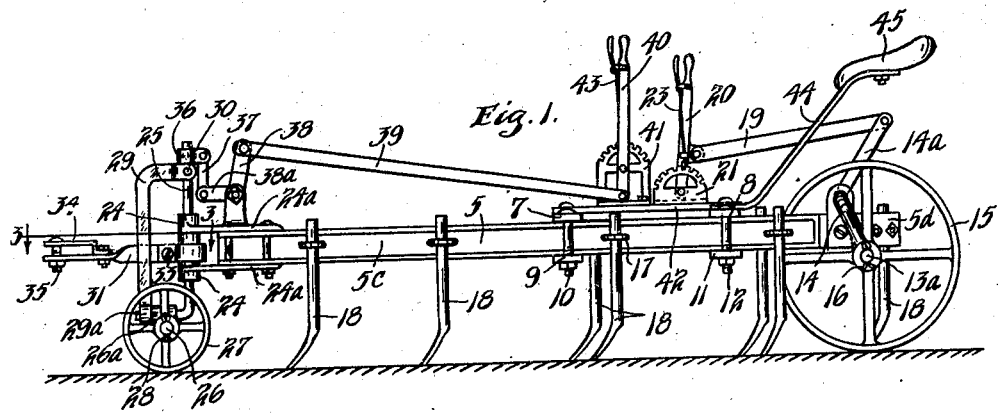
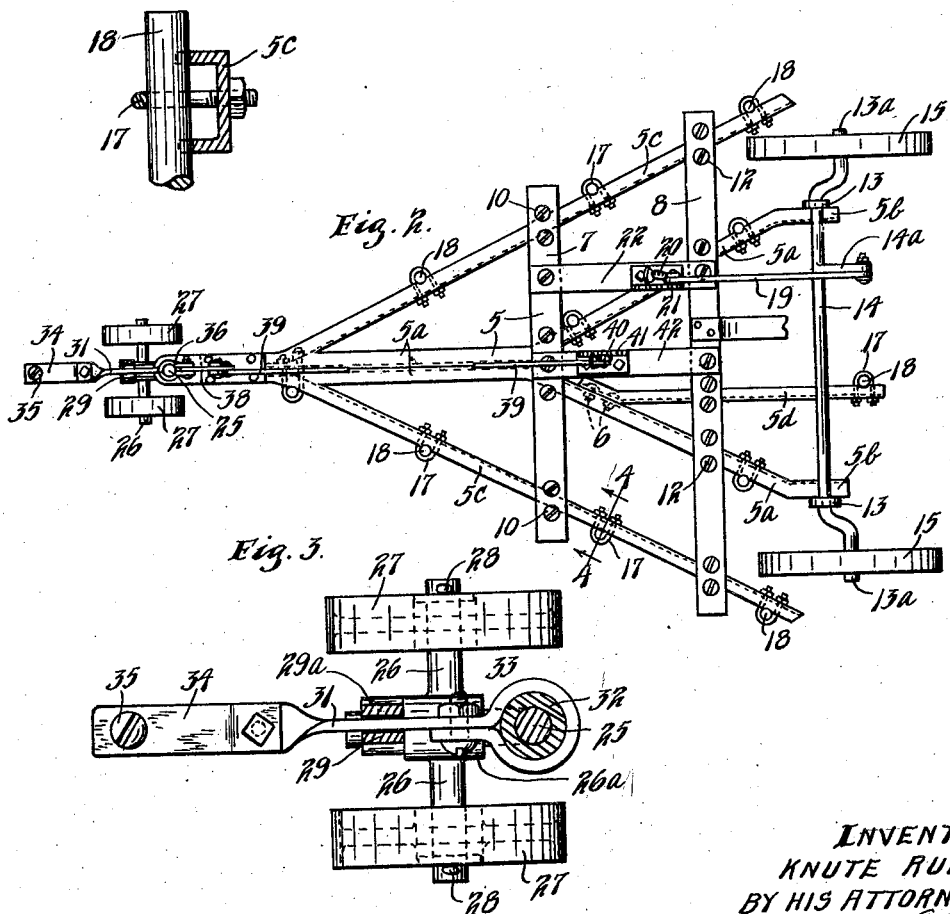
INVENTOR.
KNUTE RUE.
BY HIS ATTORNEYS.

Patented June 24, 1930

1,767,619

UNITED STATES PATENT OFFICE

KNUTE RUE, OF MAPLETON, MINNESOTA

QUACK-GRASS ERADICATOR

Application filed September 29, 1926. Serial No. 138,421.

This invention relates to a machine designed to eliminate quack grass or similar obnoxious grass or weeds. As is well known to many people, quack grass spreads very rapidly and grows quite vigorously. This grass and some other similar grasses have underground runners or root which become very numerous. In order to effectively destroy the grass it is necessary that the root be largely torn apart and dug up so that they may be withered and dried by the sun.

It is an object of this invention, therefore, to provide a machine of very simple construction which will effectively dig up the ground and tear out and destroy the quack grass and the roots thereof.

It is a further object of the invention to provide such a machine having a frame composed of spaced members to which are adjustably secured a plurality of depending blades or shovels spaced longitudinally and transversely so that all of the ground within the range of said machine is thoroughly dug up and the roots of grass cut and torn therefrom.

It is another object of the invention to provide such a machine as set forth in the preceding paragraph having a pair of supporting wheels at the rear thereof and one or more swinging caster wheels at the front, said machine having means for raising and lowering the frame thereof at both its front and rear ends.

It is more specifically an object of the invention to provide a quack grass destroying machine comprising a frame formed of rearwardly diverging members to which the depending blades or shovels are secured, said blades or shovels being spaced longitudinally of said members in such manner that they move in paths which are spaced transversely of the machine when the machine is drawn forward, said frame having an axle at its rear end with supporting wheels at the ends thereof and having a wheel supporting standard at its front end on which the frame is swiveled on which said frame is also vertically movable, together with means disposed in convenient position for manipulation by the operator in raising and lowering said frame at its front and rear ends.

These and other objects and advantages of the invention will be fully set forth in the following description made in connection with the accompanying drawings in which like reference characters refer to the same parts throughout the different views, and in which, Fig. 1 is a view in side elevation of the machine;

Fig. 2 is a plan view thereof;

Fig. 3 is a horizontal section taken on the line 3—3 of Fig. 1, as indicated by the arrows; and Fig. 4 is a vertical section taken on the line 4—4 of Fig. 2, as indicated by the arrows, Figs. 3 and 4 being shown on an enlarged scale.

Referring to the drawings, a machine is shown having a frame designated generally as 5, which frame comprises a pair of central members $5^a$ extending longitudinally of the frame in contact at their forward ends and diverging from each other at the rear of the frame, said members having rearwardly extending parallel rear ends $5^b$. Outer frame members $5^c$ are secured to the frame members $5^a$ at the forward portions thereof and diverge toward the rear of the machine making substantially equal angles with the frame members $5^a$. Another frame member $5^d$ is secured to one of the members $5^a$ adjacent the junction of said members and extends rearwardly therefrom between the members $5^a$. While the members $5^a$, $5^c$ and $5^d$ may be made of various material, in the embodiment of the invention illustrated, they are shown as made from standard channel bars. The members $5^a$ are disposed with their webs together and will be secured together either by welding, as illustrated, or by suitable bolts. The members $5^c$ are also shown as having their webs at their inner sides and are welded to the members $5^a$. The member $5^d$ is shown as connected to one of the members $5^a$ by a headed and nutted bolts 6 passing through the webs of the channel members $5^a$ and $5^d$. The frame also comprises transversely extending bars 7 and 8 which extend across the tops of members $5^a$, $5^c$ and $5^d$ having their outer ends projecting slightly beyond the members $5^c$. A bar 9 also extends beneath members 5ª and 5ᶜ, which bar is of the same length as bar 7 and is connected thereto by the headed and nutted bolts 10 extending through bars 7 and 9 and at each side of members 5ᶜ and at the outer sides of members 5ª. Another bar 11 extends beneath members 5ª, 5ᶜ and 5ᵈ which is of the same length as bar 8 and is secured thereto by headed and nutted bolts 12 which extend at each side of the members 5ª, 5ᶜ and 5ᵈ, as clearly shown in Fig. 2. The members 5ª, 5ᶜ and 5ᵈ have secured thereto by the threaded and nutted U-shaped clips 17 downwardly extending blades or shovels 18, said blades or shovels having cylindrical shanks extending through said clips, which blades or shovels are adapted to move through and dig up the ground as the machine is advanced. As shown in Figs. 2 and 4, the flanges of the members 5ª, 5ᶜ and 5ᵈ have vertically extending semi-cylindrical grooves formed therein in which the shanks of the members 18 are seated. It will be noted that the members 18 are spaced longitudinally of members 5ª, 5ᶜ and 5ᵈ in such a manner that, as the machine moves forwardly, said blades will move in paths which are laterally spaced across the entire width of said machine. The portions 5ᵇ of members 5ª have vertically disposed brackets 13 bolted thereto having apertures at their upper ends through which extends an axle 14 having its ends 13ª offset forming, in effect, cranks, supporting wheels 15 being carried at each end of axle 14, which wheels may be held on said axles by any suitable means, such as the cotter pins 16 extending through said axles. The axle 14 has an arm 14ª projecting therefrom between the brackets 13 to which is pivoted a link 19 which is pivoted at its other end to an intermediate point of a hand lever 20 upstanding from and pivoted at its lower end to a notched segment 21 bolted to a plate 22 extending between and bolted to the bars 7 and 8. A spring operated pawl crank 23 is mounted on lever 20 and adapted to engage at its lower end with any one of the notches in the segment 21.

The forward ends of the members 5ª are embraced at top and bottom by the arms 24ª of a bracket 24 having spaced alined hubs at its forward end which project beyond the end of members 5ª and a standard, illustrated as a cylindrical rod 25, is journaled in said hubs or brackets 24. A standard 25 is bent to extend forwardly at its lower end substantially at a right angle, and said end extends through a hub 26ª upstanding centrally from an axle member 26 extending at each side thereof. Wheels 27 are journaled at the end of axle 26 and held thereon by any suitable means, such as the cotter pins 28 extending through the ends of said axle. Forwardly of the hub 26ª the standard 25 is embraced by a hub 29ª from which extend upwardly spaced bars 29. The bars 29 are joined at their upper ends and bent to extend horizontally and rearwardly and are pivoted by a bolt 30 to one side of standard 25. A hitch member 31 is provided in the form of a flat bar which extends between the members 29 and has a hub or eyelet formed at its rear end embracing a sleeve 32 which is loosely mounted on standard 25 between the hubs of brackets 24. While the hub or eyelet on member 31 may be variously formed, in the embodiment of the invention illustrated it is shown as formed by merely bending the end of bar 31 into cylindrical form and securing the end by the headed and nutted bolt 33. The front end of bar 31 is twisted to lie in a horizontal plane and has bolted to the upper side thereof a bracket 34 having a portion offset and extending parallel to the bent end of bar 31 to form a clevis and a headed and nutted bolt 35 extends between members 31 and 34 for the attachment of some tractor means. The standard 25 has a U-shaped clip 36 clamped to its upper end to the rear end of which is pivoted the upper end of a link 37, the lower end of which is pivoted to the forwardly extending arm 38ª of a bell crank lever 38, which latter is pivoted at its vertex portion to an upstanding lug on bracket 24. The other and upwardly extending arm of bell crank lever 38 is pivoted at its upper end to the forward end of a link 39 which extends rearwardly of the machine and is pivoted at its rear end to the lower end of a hand lever 40 which is intermediately pivoted to a notched segment bracket 41 bolted to a plate 42 secured at its ends and extending between bars 7 and 8 of the frame. The lever 40 has a pawl grip rod 43 pivoted thereto, the lower end of which is adapted to engage in any one of the notches in the segment 41. The machine has a seat-supporting bar 44 secured to the bar 8 extending upwardly and rearwardly therefrom, which supports an operator's seat 45. The bar 44, preferably, will be made of slightly resilient material.

In operation, the machine will be drawn forwardly by a suitable tractor means and the blades 18 will be positioned so that they will move through the ground, and these blades will dig up the ground in grooves or furrows which are quite close to each other. The quack grass will thus be effectively torn out and dug up and the roots thereof divided and torn apart. The grass will thus be effectively destroyed, withered and dried up by the sun. The blades 18 may be individually adjusted vertically and the frame 5 may be raised and lowered independently at its front and rear ends. It will be seen that if the lever 20 is swung rearwardly or pulled rearwardly by the operator sitting in the seat 45, that link 14ª will be rotated in a rearward direction so that the axle 14 is turned in a clockwise direction. This, in effect, rotates the ends 13ª of the axle so that the downwardly extending portions of the axle swing toward a vertical position. This raises the rear end of the frame. If the operator swings the lever 20 forwardly, the downwardly extending portions of the axle swing rearwardly from a vertical position and the frame is lowered. The frame can be held in the desired position by allowing the pawl 23 to engage in the segment 21. If the operator pulls rearwardly on lever 40 the link 39 is moved forwardly and bell crank lever 38 is rotated in a counter-clockwise direction. The arm 38ª then pulls down on the standard 25 which is rigidly supported by the wheels 27 so that the front end of the frame is raised and moved upward on the standard 25. It will be seen that the hitch member 31, with the member 29, can be swung from side to side through substantially 180 degrees so that the machine may be moved sidewise when desired, the wheels 27 acting as caster wheels.

From the above description it is seen that applicant has provided a very simple, strong and durable machine for digging out and destroying quack grass and similar obnoxious grasses and weeds. The ground is thoroughly dug up and the grass thoroughly torn apart, dug out and destroyed. The machine is very simple in construction and involves comparatively few parts which are easily made and assembled. The machine is easily operated and has a very large capacity. In practice, the distance between the outside rear shovels is substantially seven feet and the rear wheels are substantially twenty six inches in diameter, the blade member 18 being substantially twenty inches in length. Quite a few of the machines have been constructed in actual practice and have been found to be very successful and efficient for the purpose intended.

It will, of course, be understood that various changes may be made in the form, details, arrangement and proportions of the parts without departing from the scope of applicant's invention which, generally stated, consists of the parts and combinations of parts disclosed and defined in the appended claim.

What is claimed is:

A quack grass destroying machine having in combination, a frame comprising a longitudinally extending central beam, rearwardly diverging bars extending from adjacent the front end of said beam, a plurality of vertically and individually adjustable blades secured to said bars and spaced therealong, a pair of rearwardly diverging bars extending from adjacent the rear of said beam, a plurality of vertically and individually adjustable blades secured to said last mentioned bars and spaced therealong, all of said blades being spaced substantially equal distances transversely of said frame, a crank axle journaled in the ends of said last mentioned bars, wheels carried at the ends of said axle within the rear ends of said first mentioned bars and within the lines of the outermost teeth, a seat, a lever within reach of said seat, means connected to said lever for oscillating said axle and raising and lowering the rear end of said frame, a post journaled in the front end of said central beam, castor wheels carried by the lower end of said post, a second lever within reach of said seat and means connected to said second lever for raising and lowering the front end of said beam on said post, said post and castor wheels being oscillatable about the axis of said post and said seat, second lever and last mentioned means being mounted on said central beam.

In testimony whereof I affix my signature.

KNUTE RUE.